(12) United States Patent
Sharp

(10) Patent No.: US 8,379,929 B2
(45) Date of Patent: Feb. 19, 2013

(54) METHODS AND APPARATUS FOR PERFORMING ANGULAR MEASUREMENTS

(75) Inventor: Kevin Sharp, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 631 days.

(21) Appl. No.: 12/616,673

(22) Filed: Nov. 11, 2009

(65) Prior Publication Data

US 2010/0172546 A1 Jul. 8, 2010

Related U.S. Application Data

(60) Provisional application No. 61/143,375, filed on Jan. 8, 2009.

(51) Int. Cl.
*G06K 9/00* (2006.01)
(52) U.S. Cl. .............................. 382/106; 382/154
(58) Field of Classification Search .................... None
See application file for complete search history.

(56) References Cited

U.S. PATENT DOCUMENTS

| | | | |
|---|---|---|---|
| 5,642,285 A | 6/1997 | Woo et al. | |
| 5,760,909 A | 6/1998 | Nichols | |
| 5,825,412 A | 10/1998 | Hobson et al. | |
| 6,147,598 A | 11/2000 | Murphy et al. | |
| 6,282,362 B1 | 8/2001 | Murphy et al. | |
| 6,346,980 B1 | 2/2002 | Tani et al. | |
| 7,075,661 B2 | 7/2006 | Petty et al. | |
| 7,184,088 B1 * | 2/2007 | Ball | 348/348 |
| 7,339,611 B2 | 3/2008 | Marold et al. | |
| 7,541,974 B2 | 6/2009 | Scherzinger | |
| 7,619,561 B2 | 11/2009 | Scherzinger | |
| 7,697,127 B2 | 4/2010 | Vogel et al. | |
| 7,719,467 B2 | 5/2010 | Norda et al. | |
| 2004/0051711 A1 * | 3/2004 | Dimsdale et al. | 345/419 |
| 2005/0125142 A1 | 6/2005 | Yamane | |

(Continued)

FOREIGN PATENT DOCUMENTS

| | | |
|---|---|---|
| DE | 19922321 C2 | 7/2002 |
| EP | 1936323 A2 | 6/2008 |

(Continued)

OTHER PUBLICATIONS

M. Pollefeys; D. Nister; J.M. Frahm; A. Akbarzadeh, . . . and H. Towles, "Detailed Real-Time Urban 3D Reconstruction from Video", Oct. 20, 2007, Springer Science+Business Media, LLC 2007, pp. 143-167.*

(Continued)

*Primary Examiner* — Andrew W Johns
*Assistant Examiner* — Siamak Harandi
(74) *Attorney, Agent, or Firm* — Kilpatrick Townsend and Stockton LLP

(57) ABSTRACT

A method of determining an azimuth and elevation of a point in an image is provided. The method comprises positioning an imaging device at a first position and acquiring a first image. The method also comprises rotating the imaging device and acquiring a second image at the first position. The first image includes the point, and a portion of the first image overlaps a portion of the second image. The method also includes determining correspondences between features in overlapping portions of the images, determining a first transformation between coordinates of the first image and coordinates of the second image based on the correspondences, and determining a second transformation between the coordinates of the second image and a local coordinate frame. The method also includes computing the azimuth and elevation of the point based on the first transformation and the second transformation.

21 Claims, 10 Drawing Sheets

U.S. PATENT DOCUMENTS

| | | | |
|---|---|---|---|
| 2007/0008515 A1 | 1/2007 | Otani et al. | |
| 2007/0127816 A1* | 6/2007 | Balslev et al. | 382/181 |
| 2007/0263924 A1* | 11/2007 | Kochi et al. | 382/154 |
| 2007/0288197 A1 | 12/2007 | Martin | |
| 2008/0129824 A1 | 6/2008 | Loveless | |
| 2009/0138233 A1 | 5/2009 | Kludas et al. | |
| 2009/0220144 A1 | 9/2009 | Mein et al. | |
| 2009/0262974 A1 | 10/2009 | Lithopoulos | |
| 2010/0141759 A1 | 6/2010 | Scherzinger | |
| 2010/0172546 A1 | 7/2010 | Sharp | |
| 2010/0174507 A1 | 7/2010 | Vogel et al. | |
| 2012/0013736 A1 | 1/2012 | Graesser | |

FOREIGN PATENT DOCUMENTS

| | | |
|---|---|---|
| EP | 1944572 A1 | 7/2008 |
| WO | WO 2005/059473 A3 | 6/2005 |
| WO | WO 2007/031248 A2 | 3/2007 |
| WO | WO 2009/100773 A1 | 8/2009 |
| WO | WO 2009/100774 A1 | 8/2009 |
| WO | WO 2009/103342 A1 | 8/2009 |
| WO | WO 2009/106136 A1 | 9/2009 |
| WO | WO 2009/106141 A1 | 9/2009 |
| WO | WO 2010/080950 A1 | 7/2010 |

OTHER PUBLICATIONS

F. Pedersini; A. Sarti; and S. Tubaro, "Multi-camera parameter tracking", Feb. 2001, IEE Proc.-Vis. Image Signal Process., vol. 148, No. 1, pp. 70-77.*

Albertz, "Albrecht Meydenbauer—Pioneer of Photogrammetric Documentation of the Cultural Heritage." Proceedings 18$^{th}$ International Symposium CIPA 2001, Potsdam Germany, Sep. 18-21, 2001, pp. 19-25.

Bouguet, "Pyramidal Implementation of the Lucas Kanade Feature Tracker Description of the Algorithm." 2000, pp. 1-9, Intel Corporation—Microprocessor Research Labs.

Capel, "Image Mosaicing and Super-Resolution." University of Oxford, Trinity Term, 2001, 269 pages.

Engels et al., "Bundle Adjustment Rules." 6 pages, available at URL: http://www.hasler.net/Meydenb.pdf.

Gruen, et al., "Calibration and Orientation of Cameras in Computer Vision," Chapter 4—FRASER, Photogrammetric Camera Component Calibration: A Review of Analytical Techniques, Copyright 2001, pp. 95-121, Springer-Verlag, Berlin Heidelberg, Germany.

Harris, et al., "A Combined Corner and Edge Detector." Copyright 1988, pp. 147-151, The Plessey Company plc, United Kingdom.

Hartley, et al., "Multiple View Geometry in Computer Vision." Chapter 18, N-View Computational Methods, Copyright 2000, pp. 434-457, Cambridge University Press, United Kingdom.

Heckbert, "Fundamentals of Texture Mapping and Image Warping," Master's Thesis, Jun. 17, 1989, 94 pages, Copyright 1989, Paul S. Heckbert.

Nister, et al., "What Do Four Points in Two Calibrated Images Tell us About the Epipoles?" 15 pages.

Shum, et al., "Construction of Panoramic Image Mosaics with Global and Local Alignment." May 1998, Copyright 1999, 48 pages, Kluwer Academic Publishers, Netherlands.

Stein, "Accurate Internal Camera Calibration Using Rotation, with Analysis of Sources of Error." Copyright 1995, 230 pages, IEEE.

Stone, et al., "A Fast Direct Fourier-Based Algorithm for Subpixel Registration of Images." IEEE Transactions on Geoscience and Remote Sensing, Oct. 2001, Copyright 2001, pp. 2235-2243, vol. 39, No. 10, IEEE.

Stricker et al., "Real-Time and Markerless Vision-Based Tracking for Outdoor Augmented Reality Applications." Proceedings of the IEEE and ACM International Symposium on Augmented Reality, Copyright 2001, 2 pages, IEEE.

Szeliski, "Image Alignment and Stitching: A Tutorial." Preliminary Draft—Technical Report MSR-TR-2004-92, Jan. 26, 2005, 71 pages, available at URL: http://robots.stanford.edu/cs223b05/MSR-TR-2004-92-Jan26.pdf.

Szeliski, "Image Alignment and Stitching: A Tutorial." Foundations and Trends® in Computer Graphic and Vision, Copyright 2006, 105 pages, vol. 2, No. 1, DOI: 10.1561/0600000009, 105 pages, available at URL: http://research.microsoft.com/pubs/75695/Szeliski-FnT06.pdf.

Szeliski, "Video Mosaics for Virtual Environments," IEEE Computer Graphics and Applications, Mar. 1996, Copyright 1996, pp. 22-30, vol. 16, No. 2, IEEE.

Tsai, "An Efficient and Accurate Camera Calibration Technique for 3D Machine Vision." IEEE Computer Society Conference on Computer Vision and Pattern Recognition Jun. 22-26, 1986, Copyright 1986, pp. 364-374, IEEE Computer Society Press, Washington D.C.

Tsai, "Synopsis of Recent Progress on Camera Calibration for 3D Machine Vision." The Robotics Review 1, pp. 147-159, 1989, The MIT Press.

International Search Report and Written Opinion for PCT Patent Application No. PCT/US2010/020428 mailed on Mar. 17, 2010, 10 pages.

Photo Towers, Professional Camera Support, Tall Tripods, Retrieved from http://www.photo-towers.com/tall-tripods.htm on Sep. 6, 2011, 1 page.

Notice of Allowance of Sep. 10, 2012 for U.S. Appl. No. 13/143,320, 7 pages.

Non-Final Office Action of Jun. 22, 2012 for U.S. Appl. No. 13/143,320, 24 pages.

* cited by examiner

METHODS AND APPARATUS FOR PERFORMING ANGULAR MEASUREMENTS

CROSS-REFERENCES TO RELATED APPLICATIONS

This application is a non-provisional application of and claims the benefit of U.S. Provisional Application No. 61/143,375, filed Jan. 8, 2009, which is incorporated herein by reference in its entirety for all purposes.

BACKGROUND OF THE INVENTION

The present invention relates generally to methods and apparatus for performing angular measurements. Merely by way of example, embodiments of the present invention provide methods for acquiring high resolution angular measurements using images. Such measurements may be used, for example, in surveying applications. However, the scope of embodiments of the present invention is broader than this particular application and can be applied to other applications utilizing angular measurements.

The art of surveying involves the determination of unknown positions using measurements of angles and distances. For example, in some surveying operations horizontal and vertical angles and distance are measured between reference and target points. In other surveying operations, horizontal and vertical angles are measured between more than one reference point and a target point. In either case, the measured data may be used to calculate the position of the target point.

A theodolite is a surveying instrument that is commonly used to measure horizontal and vertical angles. A theodolite typically includes a telescope mounted so that it can be rotated about horizontal and vertical axes. A theodolite may include circular scales that are used in measuring the angular position of the telescope. The horizontal angle (e.g. yaw) and the vertical angle (e.g. pitch) are read from the circular scales to determine the yaw and pitch of the target with respect to a reference point. Some modern electronic theodolites utilize angle encoders instead of scales to automate angular measurements.

Despite the utility of theodolites, improved methods and apparatus for acquiring angular measurements are desired.

SUMMARY OF THE INVENTION

The present invention provides improved methods and apparatus for performing angular measurements by using images. Such measurements may be used, for example, in surveying applications. However, the scope of embodiments of the present invention is broader than this particular application and can be applied to other applications utilizing angular measurements.

In accordance with an embodiment of the present invention, a method of determining an azimuth and an elevation of a point in a first image is provided. The method comprises positioning an imaging device at a first position and acquiring the first image at the first position. The method also includes performing a first rotation of the imaging device and acquiring a second image at the first position. The first image includes the point, and a portion of the first image overlaps a portion of the second image. The method also includes determining correspondences between features in overlapping portions of the first image and the second image, determining a first transformation between coordinates of the first image and coordinates of the second image based on the correspondences, and determining a second transformation between the coordinates of the second image and a local coordinate frame. The method also includes computing the azimuth and the elevation of the point based on the first transformation and the second transformation.

In accordance with yet another embodiment of the present invention, a method of determining a horizontal angle and a vertical angle between a first point in a first image and a second point in a second image is provided. The method comprises obtaining a series of images including the first image and the second image. A portion of each image in the series overlaps a portion of another image in the series and each image in the series is obtained from a first position. The method also comprises determining correspondences between features in overlapping portions of images in the series of images, determining first transformations between coordinates of overlapping images in the series of images, and computing the horizontal angle and the vertical angle between the first point and the second point based on the first transformations.

In accordance with yet another embodiment of the invention, a surveying apparatus is provided. The apparatus comprises a support structure, a rotatable member mechanically coupled to the support structure, and an imaging device mechanically coupled to the rotatable member. The rotatable member may be configured to rotate the imaging device without substantially changing a position of an optical center of the imaging device. The apparatus also comprises an image sensor disposed in the imaging device, a memory in electrical communication with the image sensor, and a processor in electrical communication with the image sensor and the memory. The processor may be configured to determine correspondences between features in overlapping portions of the images, determine first transformations between coordinates of overlapping images based on the correspondences, determine a second transformation between coordinates of one of the images and a local coordinate frame, and compute an azimuth and an elevation of each of a plurality of points in the images based on the first transformations and the second transformation.

Numerous benefits are achieved using the present invention over conventional techniques. For example, an embodiment according to the present invention provides an inexpensive instrument for measuring angles with high accuracy. The instrument does not utilize expensive scales or encoders and tolerances on mechanical components are reduced. Measurement cost may also be reduced, as some embodiments allow measurements between points to be made from a series of images. The measurements can be performed in the field at the time the images are acquired, or at a later time using images stored in memory. Furthermore, because the points are identified in the image, the image can be used as a visual audit trail of points that have been measured.

Depending upon the embodiment, one or more of these benefits may exist. These and other benefits are described throughout the specification and more particularly below.

DETAILED DESCRIPTION OF THE INVENTION

Embodiments of the present invention provide methods and apparatus for acquiring high resolution angular measurements using images. The measurements can be made without the use of scales or encoders as required with conventional theodolites, thus providing a virtual or encoderless theodolite. As explained more fully below, some embodiments include acquiring a series of overlapping images from a particular position. Coordinate transformations can be determined between the images, and constraints can be applied that allow angles between points in the images to be determined using the coordinate transformations. As with a conventional theodolite, a coordinate transformation between the image coordinate frame and a real world coordinate system (e.g., the local coordinate frame) can also be determined allowing azimuth and elevation to be measured.

Figure 1:
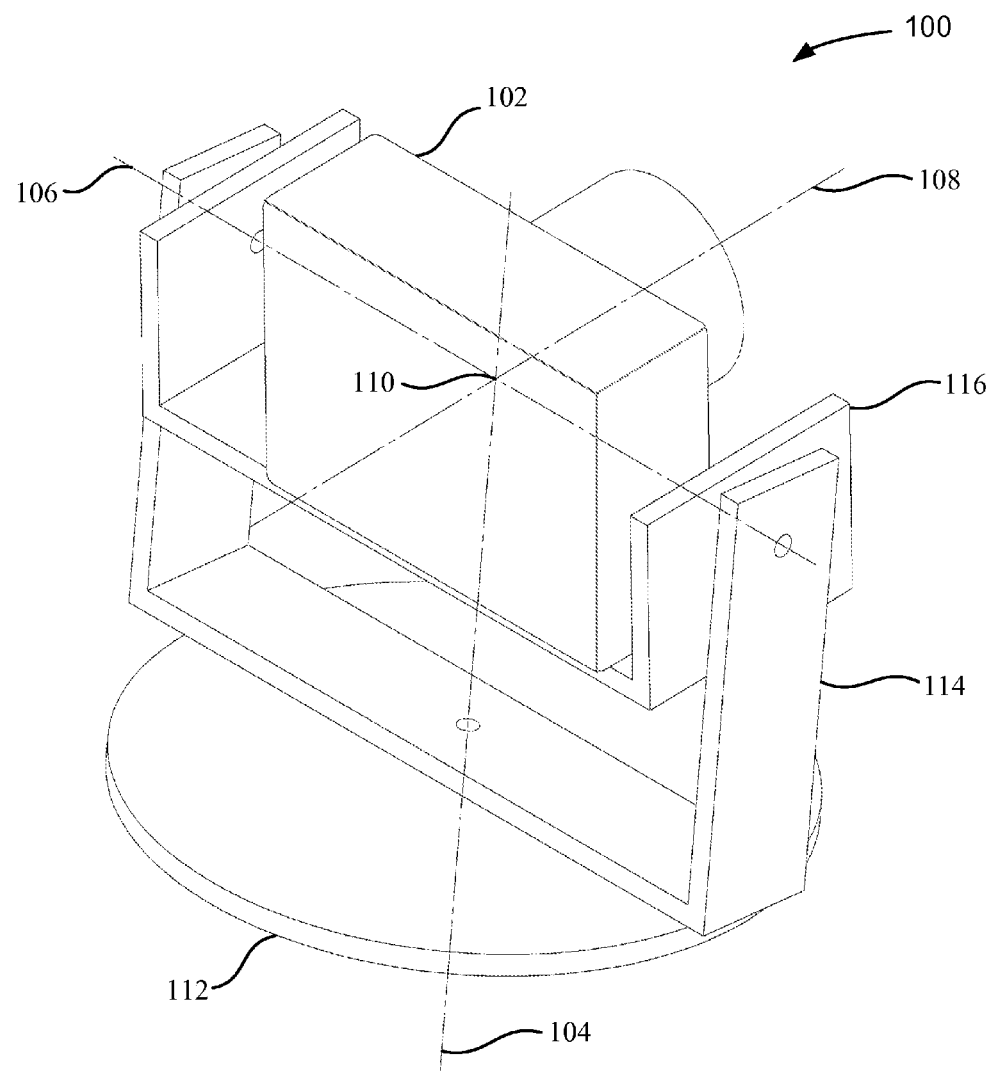
FIG. 1 is a simplified perspective view of a surveying apparatus that may be used to acquire overlapping images in accordance with an embodiment of the present invention.

FIG. 1 is a simplified perspective view of a surveying apparatus 100 that may be used to acquire overlapping images in accordance with an embodiment of the present invention. The surveying apparatus 100 includes an imaging device 102, which may be a digital camera or other suitable device capable of acquiring image data using image sensors. The image sensors typically includes a predetermined number of photosensitive elements arranged in an array. For example, the image sensors may be a two-dimensional array of elements capable of generating image information from optical signals impinging on the elements. The number of pixels in the image generally corresponds to the number of elements in the array. The array may be a charge-coupled device (CCD) or a complimentary metal-oxide-semiconductor (CMOS) image sensor array. Other suitable arrays containing photosensitive elements are also included within the scope of the present invention.

In the embodiment shown in FIG. 1, the imaging device 102 is mounted in a two axis gimbal that allows rotation about a horizontal axis 106 and a vertical axis 104. The horizontal and vertical axes 106, 104 intersect at the optical center 110 (or center of the entrance pupil) of the imaging device 102. The optical axis 108 of the imaging device 102 is perpendicular to the horizontal axis 106. In this example, the horizontal and vertical axes 106, 104 are defined relative to the base 112.

The base 112 may be supported by a pole, tripod, or other suitable structure. In some embodiments the base 112 may be aligned relative to the local gravity vector. The inner bracket 116 is mounted to the outer bracket 114 and allows the imaging device 102 to rotate about the horizontal axis 106. The outer bracket 114 is mounted to the base 112 and allows the imaging device 102 to rotate about the vertical axis 104. The two axis gimbal allows independent rotation of the imaging device 102 about the horizontal and vertical axes 106, 104. Rotation of the imaging device 102 can be achieved by any suitable means, such as by manual adjustment or servo motors under computer control.

The imaging device 102 can be rotated to adjust the pitch (i.e., rotation about the horizontal axis 106) and the yaw (i.e., rotation about the vertical axis 104) without substantially changing the position of the optical center 110. However, as would be apparent to one of ordinary skill in the art, the position of the optical center 110 may change as a result of the tolerances on the mechanical components or the alignment of the imaging device 102. Such changes are allowed up to certain tolerances. The tolerances may depend, for example, on the particular application for which the surveying apparatus 100 is used and/or the distinctness of features in the images.

The surveying apparatus 100 shown in FIG. 1 is provided merely as an example, and embodiments of the present invention are not limited to this particular apparatus. Rather, other suitable apparatus are contemplated and are to be included within the scope of the present invention. For example, embodiments of the present invention may include any suitable apparatus capable of supporting an imaging device and providing rotation about horizontal and vertical axes without substantially changing a position of an optical center of the imaging device. Furthermore, some embodiments may provide rotation about only a horizontal axis or a vertical axis, rather than both. Additionally, the apparatus may include a separate mounting arrangement, rather than the two axis gimbal illustrated in FIG. 1, or the apparatus may be coupled directly to a support structure.

Figure 2:
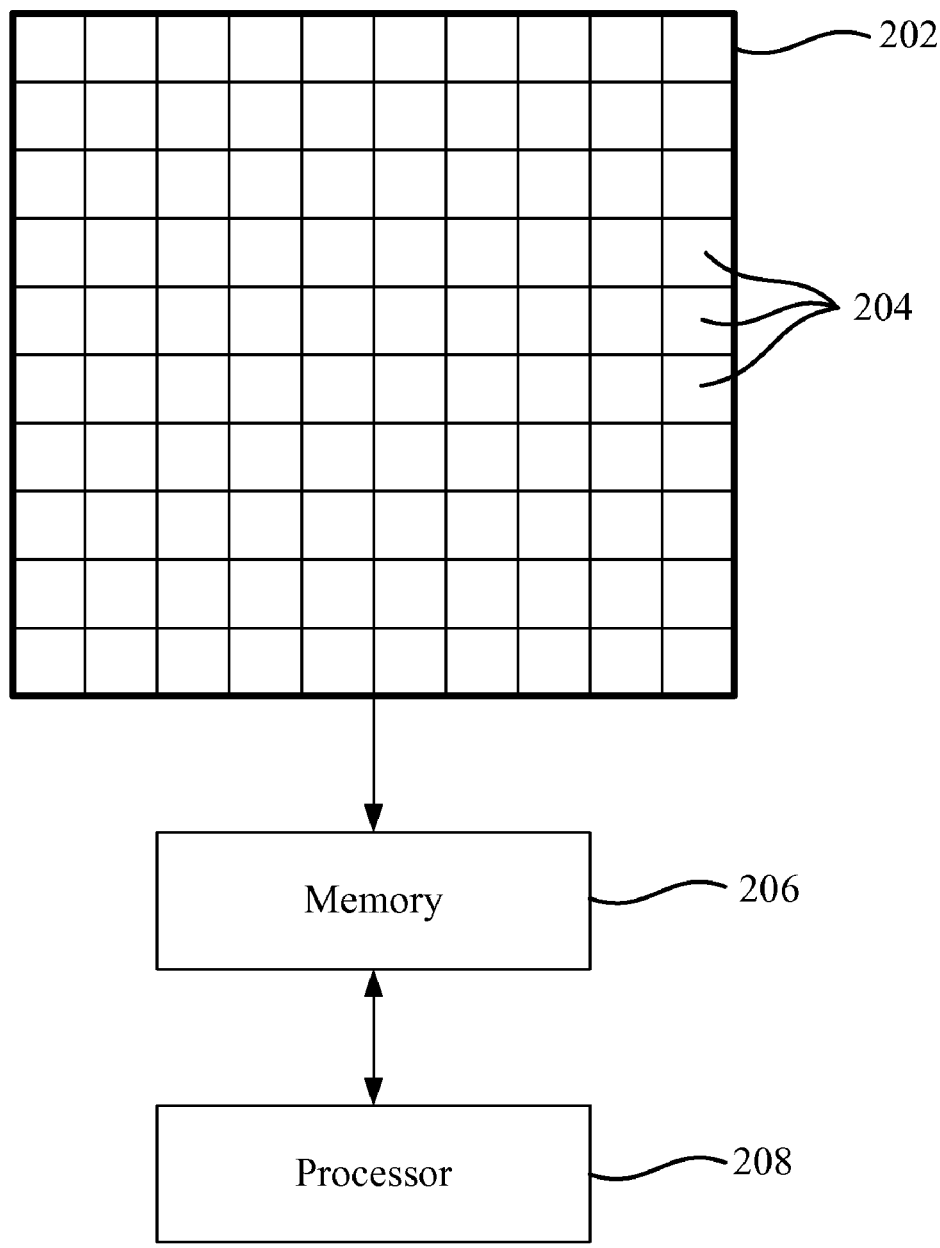
FIG. 2 is a simplified diagram illustrating an image sensor with a plurality of image sensor elements according to an embodiment of the present invention.

FIG. 2 is a simplified diagram illustrating an image sensor with a plurality of image sensor elements according to an embodiment of the present invention. The image sensor 202 may be disposed in an imaging device, such as the imaging device 102 shown in FIG. 1. As illustrated in FIG. 2, the image sensor 202 includes a plurality of image sensor elements 204 arranged in an array. The image sensor elements generally correspond to the pixels of images produced by the image sensor. In some embodiments, the image sensor 202 is in communication with a memory 206. The memory 206 may be local or remote. The memory 206 may be configured to store the image data. Some embodiments also include a processor 208 in communication with the memory 206. As explained more fully below, the processor 208 may be configured to determine coordinate transformations between overlapping images and/or between a local coordinate frame and an image coordinate frame. The processor 208 may also be configured to determine angles between points in the images using the coordinate transformations. The processor 208 may communicate with the memory 206 via a wired or wireless connection. Although FIG. 2 shows the memory 206 and the processor 208 as separate elements, these elements may be integrated as a single component. Alternatively, in some embodiments the processor 208 may be part of a computing device that is separate from the surveying apparatus. One of ordinary skill in the art would recognize many variations, modifications, and alternatives.

In accordance with an embodiment, the imaging device 102 of FIG. 1 may be calibrated to establish a mapping between a camera coordinate frame and an image coordinate frame. As would be understood by one of ordinary skill in the art, calibration is generally an infrequent procedure carried out at the time of manufacture or when it is suspected the optics have gone out of calibration (e.g., rough handling). Calibration of the imaging device 102 may be performed in accordance with known techniques. As an example, mapping of an ideal lens may be defined by the following equations:

$$x_p - x_0 = f\frac{X}{Z} \qquad (1)$$

$$y_p - y_0 = f\frac{Y}{Z} \qquad (2)$$

where $x_p$, $y_p$ is a position in an image plane; X, Y, Z is the corresponding three-dimensional position with respect to the camera coordinate frame; $x_0$, $y_0$ is the principal point of the plane (explained below); and f is the focal length of the imaging device 102. Accordingly, normalized image coordinates x, y for an ideal (undistorted) lens may be defined as:

$$x = \frac{x_p - x_0}{f} \qquad (3)$$

$$y = \frac{y_p - y_0}{f} \qquad (4)$$

Conventional calibration models generally depart from the ideal state to account for distortion. For example, a first order radial distortion may be modeled as:

$$x = x_d(1+k(x_d^2+y_d^2)) \qquad (5)$$

$$y = y_d(1+k(x_d^2+y_d^2)) \qquad (6)$$

where $x_d$, $y_d$ is a position in a distorted image plane, and k is the coefficient of radial distortion. Other models may be used in accordance with known techniques.

Figure 3:
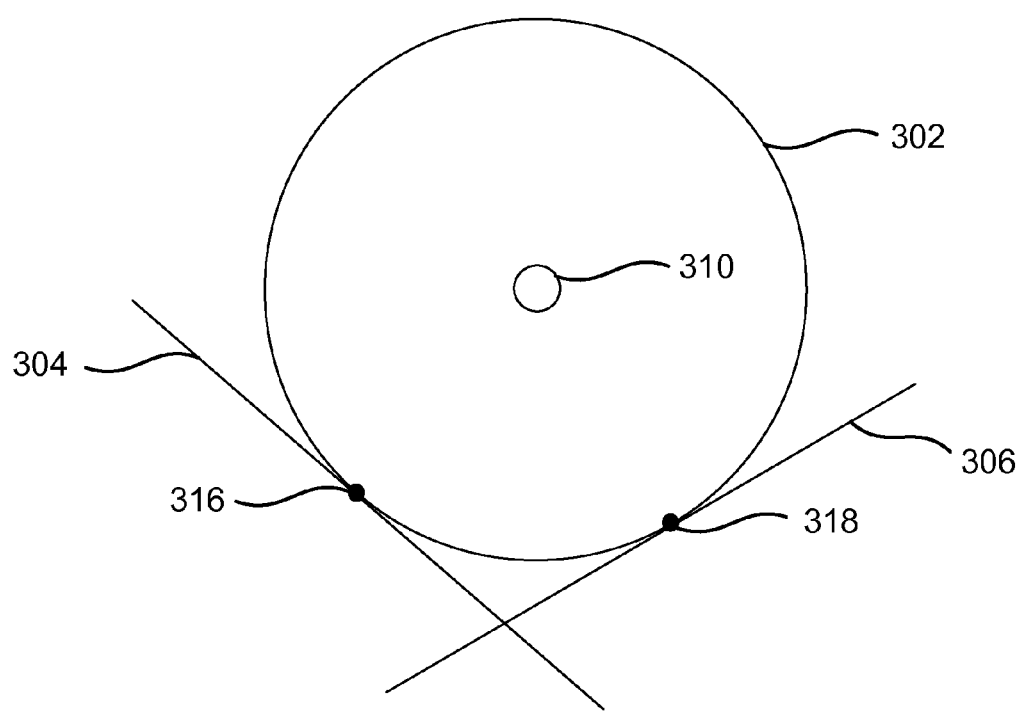
FIG. 3 is a simplified cross-sectional view showing a unit sphere centered at an optical center of an imaging device according to an embodiment of the present invention.

In accordance with an embodiment, a series of overlapping images may be acquired from a particular position using, for example, the surveying apparatus 100 illustrated in FIG. 1. Coordinate transformations between the images may be determined using any one of a number of techniques. Merely by way of example, the process of determining the coordinate transformations can be conceptualized using a unit sphere centered at the optical center 110 of the imaging device 102. FIG. 3 is a simplified cross-sectional view showing a unit sphere 302 centered at an optical center 310 of an imaging device according to an embodiment of the present invention. With the sphere 302 centered, each ray entering the imaging device passes through the optical center 310 of the sphere 302. Other shapes may also be used (e.g., cube, plane, etc.), but spheres simplify manipulation because they do not have any discontinuities. The images can be thought of as being on planes that are described by the normalized image coordinates of equations (3) and (4). With an effective focal length of unity, the image planes 304, 306 are tangent to the sphere 302 with the contact points 316, 318 being the principal points of the planes. The image planes 304, 306 have two-dimensional coordinates, but they exists in three-dimensional space. Each image can be defined in the camera reference frame with the origin of all images being the optical center 310 of the sphere 302. Accordingly, the coordinates of points on the image plane can be defined as [x, y, 1]. By defining the system in this manner, transformations between images are pure rotations.

Figure 4:
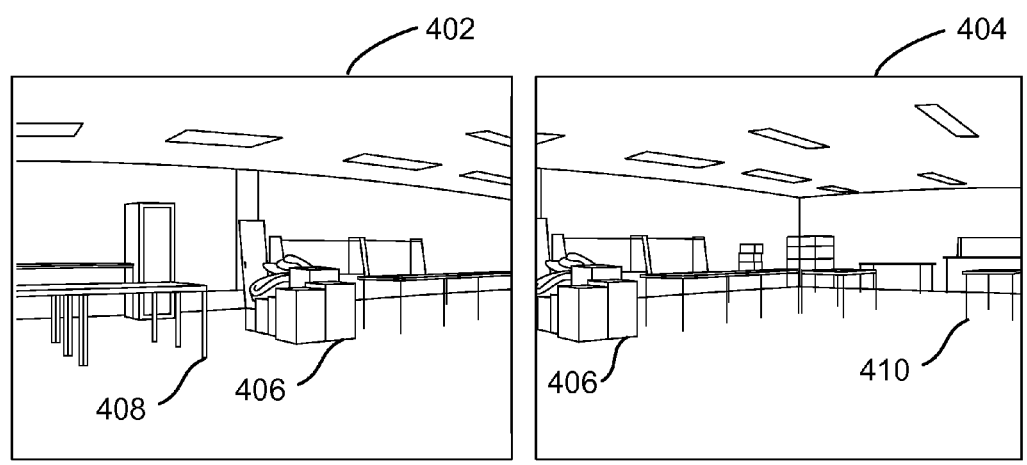
FIG. 4 is a simplified diagram illustrating overlapping images obtained using a surveying apparatus according to embodiments of the present invention.

FIG. 4 is a simplified diagram illustrating overlapping images 402, 404 obtained using a surveying apparatus according to embodiments of the present invention. The first image 402 and the second image 404 may be obtained using the imaging device 102 illustrated FIG. 1. As can be seen in FIG. 4, a portion of the first image 402 overlaps a portion of the second image 404. Thus, the images include features that are common to both images, such as the boxes 406. The images also include features that are unique to each image, such as the large table 408 shown in the first image 402 and the small table 410 shown in the second image 404. In one embodiment, the images overlap by approximately 25-75% of their field of view. Of course, the images may overlap by more or less than this amount in accordance with embodiments of the present invention. Factors that may impact the amount of overlap include the distinctness of the features that are common to both images and the accuracy required when determining transformations between overlapping images as discussed more fully below.

According to an embodiment of the present invention, the first image 402 and the second image 404 are obtained with the optical center of the imaging device at substantially the same position. For example, the first image 402 and the second image 404 may be obtained from substantially the same position of the optical center but at a different angle of rotation of the imaging device. Using the surveying apparatus 100 illustrated in FIG. 1 as an example, both images may be obtained with the optical center 110 of the imaging device 102 at substantially the same position but at a different angle of rotation about the vertical axis 104. Although not illustrated in the example of FIG. 4, the rotation of the imaging device may be about either the horizontal and/or vertical axes in accordance with embodiments of the invention.

In an embodiment, determining the coordinate transformations between the overlapping images includes determining correspondences between points in the images. Determining correspondences may include identifying features (e.g., distinctive image gradients) in the overlapping portions of the images that can be reliably identified and accurately located. Such features may be identified using well known corner detection techniques, such as the Harris corner detection algorithm. The Harris corner detection algorithm essentially determines the local maxima of the minimum eigenvector of the second moment matrix of the image gradients. The image gradients can be determined by convolution of the image with a derivative of a sampling function.

In one embodiment a variant of the Harris corner detection algorithm is utilized. In this embodiment, a grayscale image is assumed, and gradients $I_x$ and $I_y$ can be derived by convolution of the image with Gaussian differential filters according to the following equations:

$$I_x = I * G_x \qquad (7)$$

$$I_y = I * G_y \qquad (8)$$

where $$G_x = -xe^{\frac{-(x^2+y^2)}{2\sigma^2}} \qquad (9)$$

$$G_y = -ye^{\frac{-(x^2+y^2)}{2\sigma^2}} \qquad (10)$$

The image and the convolution kernel are discrete. The kernels $G_x$ and $G_y$ can be calculated for values of x and y within a specified range. As an example, the kernels $G_x$ and $G_y$ can be calculated for values of x and y within a range of ±3σ, which means the convolution is not valid within 3σ of the edges of the image. For this reason, in some embodiments a small value of σ (e.g., 1.4) is chosen. The convolution may be done in the Fourier domain for efficiency.

The second-moment matrix may be defined as:

$$S = \begin{bmatrix} I_x^2 & I_x I_y \\ I_x I_y & I_y^2 \end{bmatrix} \quad (11)$$

A smoothed version of S, Σ(S), can be obtained by convolving each of the components with a Gaussian kernel according to the following equations:

$$\Sigma(S) = \begin{bmatrix} \Sigma(I_x^2) & \Sigma(I_x I_y) \\ \Sigma(I_x I_y) & \Sigma(I_y^2) \end{bmatrix} = \begin{bmatrix} I_x^2 * G & I_x I_y * G \\ I_x I_y * G & I_y^2 * G \end{bmatrix} \quad (12)$$

where $$G = e^{\frac{-(x^2+y^2)}{2\sigma^2}} \quad (13)$$

The corner response is a measure of how well a point (or feature) in an image can be localized. The corner response may be determined by the minimum eigenvalue of Σ(S) according to the following equation:

$$\lambda_{min} = \Sigma(I_x^2) + \Sigma(I_y^2) - \sqrt{4\Sigma(I_x I_y)^2 + (\Sigma(I_x^2) - \Sigma(I_y^2))^2} \quad (14)$$

In an embodiment, the pixels that can be best localized are determined by disregarding all pixels with a value of $\lambda_{min}$ less than their surrounding pixels. Of the remaining pixels, those with high values of $\lambda_{min}$ are selected.

The image gradients identified above are determined at discrete pixel locations and are subject to perspective distortion depending on their location on the image plane relative to the principal point. This is because the image on the plane is effectively a magnified version of the image on the sphere, where the magnification factor changes according to the position on the image plane. In an embodiment, refinement steps are performed to determine sub-pixel coordinates of the image gradients and/or to account for the perspective distortion.

In an embodiment, a convolution shift theorem is used to evaluate gradients at points other than discrete pixel locations. If the following convolution is performed:

$$h(x) = I(x) * g(x) \quad (15)$$

then $$h(x + \Delta x) = I(x) * g(x + \Delta x) \quad (16)$$

The variable x is a vector that can be image coordinates [x, y] or the column and row indices of the array corresponding to their discrete representation. Although I is sampled for integer values of x, gradients can be calculated at any point x+Δx. This allows sub-pixel image gradients to be determined.

In an embodiment, convolutions can be determined on a small area of the image, for example about a point $x_c$, using the following equation:

$$h(x + x_c) = I(x + \lfloor x_c \rfloor) * g(x + \{x_c\}) \quad (17)$$

where $\lfloor x_c \rfloor$ is the floor of $x_c$, and $\{x_c\}$ is a sub-pixel part. If $I(x + \lfloor x_c \rfloor)$ is determined using a portion of the image centered about $x_c$, then the value of h corresponding to x=[0,0] will correspond to the convolution being applied at $x_c$.

In some embodiments, the cross-correlation that is equivalent to the convolution can be used, which can be defined as:

$$h(x) = I(x) \star \bar{g}(x) = I(x) * g(x) \quad (18)$$

where $$\bar{g}(x) = g(-x) \quad (19)$$

This provides:

$$h(x + \Delta x) = I(x) \star \bar{g}(x - \Delta x) \quad (20)$$

Figure 5:
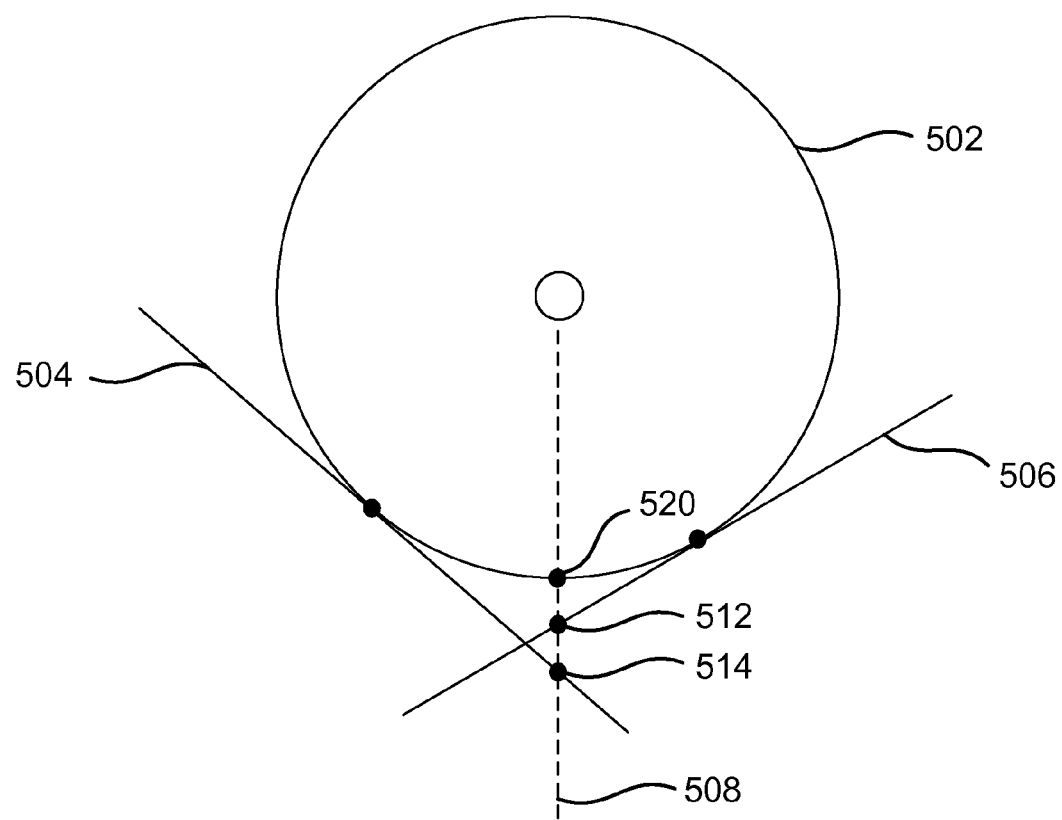
FIG. 5 is a simplified cross-sectional view of a sphere and two images planes according to an embodiment of the present invention.

The perspective distortion can be corrected using any one of a number of methods. FIG. 5 is a simplified cross-sectional view of a sphere 502 and two images planes 504, 506 according to an embodiment of the present invention. In this example, a feature is projected onto the sphere 502 at point 520. The same feature is projected onto image plane 504 at point 514 and image plane 506 at point 512. In an embodiment, convolutions are performed to calculate gradients in the area around point 514 on image plane 504 and point 512 on image plane 506. A convolution on a normalized image plane with coordinates [x, y] can be shown by:

$$h(x,y) = I(x,y) * g(x,y) \quad (21)$$

A convolution on an un-normalized image plane with coordinates [u, v] can be shown by:

$$I'(u,v) = I'(f(x,y)) = I(x,y) \quad (22)$$

Combining equations (21) and (22) provides:

$$h(u, v) = h(f(x, y)) = I'(u, v) * \frac{g(f^{-1}(u, v))}{|J([u, v], [x, y])(-f^{-1}(u, v))|} \quad (23)$$

where $|J([u, v],[x, y])(-f^{-1}(u, v))|$ is the determinant of the Jacobian of [u, v] with respect to [x, y] at the point $-f^{-1}(u, v)$.

In some embodiments, the convolution may be calculated in terms of an equivalent cross-correlation kernel that is subsequently reversed and applied as a convolution. This provides:

$$h(u, v) = I'(u, v) * \frac{g(-f^{-1}(u, v))}{|J([u, v], [x, y])(f^{-1}(u, v))|} \quad (24)$$

and since the undistorted convolution kernel is symmetric:

$$h(u, v) = I'(u, v) * \frac{g(f^{-1}(u, v))}{|J([u, v], [x, y])(f^{-1}(u, v))|} \quad (25)$$

The Jacobian can be determined by transforming [u, v] to [x, y] at a point $[u_c, v_c]$ as follows:

$$T_{uv \to xy} = \begin{bmatrix} \dfrac{1}{\sqrt{u_c^2+1}} & 0 & -\dfrac{u_c}{\sqrt{u_c^2+1}} \\ -\dfrac{u_c v_c}{\sqrt{u_c^2+1}\sqrt{v_c^2+u_c^2+1}} & \dfrac{\sqrt{u_c^2+1}}{\sqrt{v_c^2+u_c^2+1}} & -\dfrac{v_c}{\sqrt{u_c^2+1}\sqrt{v_c^2+u_c^2+1}} \\ \dfrac{u_c}{\sqrt{v_c^2+u_c^2+1}} & \dfrac{v_c}{\sqrt{v_c^2+u_c^2+1}} & \dfrac{1}{\sqrt{v_c^2+u_c^2+1}} \end{bmatrix} \quad (26)$$

where $$\begin{bmatrix} u' \\ v' \\ w' \end{bmatrix} = T_{uv \to xy} \cdot \begin{bmatrix} u \\ v \\ 1 \end{bmatrix} \quad (27)$$

and $$\begin{bmatrix} x \\ y \end{bmatrix} = \begin{bmatrix} u'/w' \\ v'/w' \end{bmatrix} \quad (28)$$

Given this, the determinant of the Jacobian can be calculated as:

$$|J([u,v],[x,y])(f^{-1}(u,v))| = w'^3 \quad (29)$$

This solution can be further elaborated to take into account camera calibration using any differentiable calibration model. As an example, describing distorted versions of [u, v] in terms of $[u_d, v_d]$, and using the function c as a shorthand for equations (5) and (6) provides:

$$[u,v] = c([u_d,v_d]) = [u_d,v_d](1+k(u_d^2+v_d^2)) \quad (30)$$

Substituting $[u_d, v_d]$ for [u, v] in equation (25) provides:

$$h(u_d, v_d) = I''(u_d, v_d) * \frac{g(f^{-1}(c([u_d, v_d])))}{|J([u_d, v_d], [x, y])(f^{-1}(c([u_d, v_d])))|} \quad (31)$$

where I'' is the distorted image such that $$I''(u_d,v_d) = I'(c([u_d,v_d])) \quad (32)$$

The determinant of the Jacobian can $|J([u_d, v_d],[x, y])|$ can be defined in terms of $|J([u, v],[x, y])|$ as follows:

$$J([u_d, v_d], [x, y]) = J([u_d, v_d], [u, v]) \cdot J([u, v], [x, y]) \quad (33)$$
and
$$J([u_d, v_d], [u, v]) = J^{-1}([u, v], [u_d, v_d]) \quad (34)$$
so that
$$\begin{aligned} |J([u_d, v_d], [x, y])| &= |J^{-1}([u, v], [u_d, v_d]) \cdot J([u, v], [x, y])| \\ &= |J^{-1}([u, v], [u_d, v_d])| \cdot |J([u, v], [x, y])| \\ &= |J([u, v], [u_d, v_d])|^{-1} \cdot |J([u, v], [x, y])| \end{aligned} \quad (35)$$

Using the calibration model given by equation (30) provides:

$$|J([u,v],[u_d,v_d])| = (ku_d^2+kv_d^2+1)(3ku_d^2+3kv_d^2+1) \quad (36)$$

Equation (31) can be rewritten as:

$$h(u_d, v_d) = I''(u_d, v_d) * \frac{g(f^{-1}(c([u_d, v_d])))(ku_d^2+kv_d^2+1)(3ku_d^2+3kv_d^2+1)}{w'^3} \quad (37)$$

In an embodiment, equations (11)-(14) can be used to identify points (or features) on the image plane, and known methods can be used to determine local maxima in the area around each feature. Equation (37) can be used to calculate precise feature coordinates on the sphere using coordinates on the image plane.

These methods were tested with synthetically generated images with a field of view of 52 degrees. The mean point correspondence error was on the order of $10^{-3}$ pixels. Adding Gaussian noise to give an image signal-to-noise ratio of 42 dB (1 bit RMS in an 8 bit image), the mean error was on the order of $10^{-2}$ pixels. Using image pairs having a pure planar rotation, as would be the limiting case for very long focal lengths, point correspondence on the order of $10^{-5}$ pixels were achieved.

Some embodiments use the feature identified using the above methods to determine correspondences between features in overlapping images. A set of pairs of points can be determined where each pair includes a feature in each of two overlapping images. In an embodiment a descriptor is determined for each feature. A descriptor may be a sequence of numbers that can be associated with a feature to uniquely identify it. The descriptor of a feature in a first image can be compared with the descriptor of a feature in a second image to determine how likely it is that the features correspond to the same location in the scene.

Figure 6:
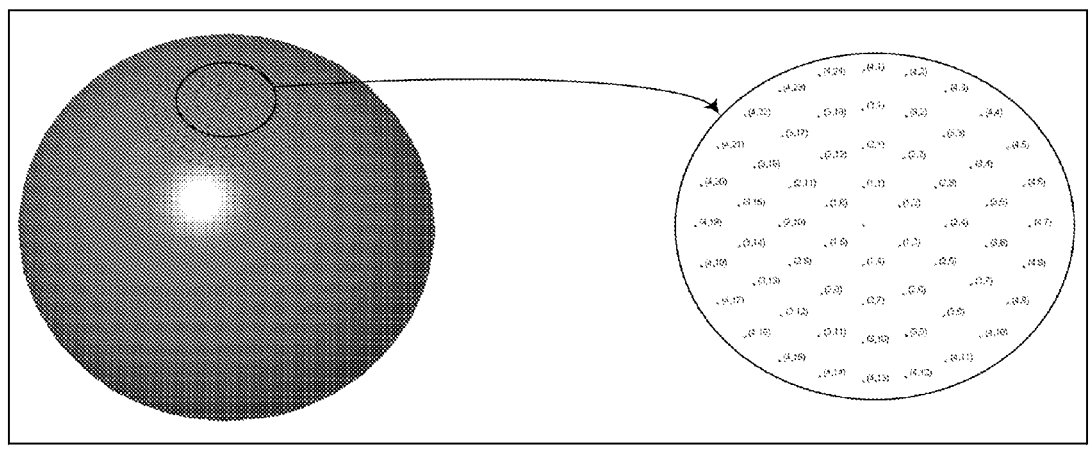
FIG. 6 is a simplified diagrams showing an area surrounding a point on a sphere with a radial sampling pattern defined according to an embodiment of the present invention.

In an embodiment the descriptors are determined by projecting a small area around each feature onto a unit sphere and defining a sampling pattern on the sphere. FIG. 6 is a simplified diagram showing an area surrounding a point on a sphere with a radial sampling pattern defined according to an embodiment of the present invention. In this example, six sample points, [1,1]-[1,6], form a ring around the feature such that the feature subtends an angle at the center of the sphere of θ to each sample point. The angle θ can be chosen to correspond to one pixel at the principal point such that:

$$\theta = \sin^{-1}\left(\frac{1}{f}\right) \quad (38)$$

where f is the focal length in pixels.

In the example shown in FIG. 6, a second ring of twelve points, [2,1]-[2,12], each subtend an angle of 2θ and so on. The number of rings used is a compromise between computational expense and guaranteeing distinctive descriptors. In an embodiment a small number of rings (e.g., 6-10) are used.

Defining the sampling pattern as $S_{f0,1 \ldots n}$ for the point [0,0,1], the sampling pattern can be transformed to the feature point $[f_x, f_y, f_z]$ by applying the transform:

$$S_{f,1 \ldots n} = \begin{bmatrix} \dfrac{f_z}{\sqrt{f_x^2+f_y^2}} & 0 & \dfrac{-f_x}{\sqrt{f_x^2+f_y^2}} \\ \dfrac{-f_x f_y}{\sqrt{f_x^2+f_y^2}} & \sqrt{f_x^2+f_y^2} & \dfrac{-f_y f_z}{\sqrt{f_x^2+f_y^2}} \\ f_x & f_y & f_z \end{bmatrix} \cdot S_{f0,1 \ldots n} \quad (39)$$

The sampling process essentially calculates the intensity at each sample site of a Gaussian blurred image formed from the projection of the image on the image plane. This can be represented as:

$$I_{f,i} = \sum_{j=1}^{m} I_j \exp(-d^2(P_j, P_{f,i})/2\sigma_d^2) \qquad (40)$$

where $I_{1 \ldots m}$ are intensities of the pixels in the image plane, $P_{1 \ldots m}$ are the corresponding pixel positions on the sphere, d is a distance function, and $\sigma_d$ is the standard deviation of the Gaussian distribution. Using the sine of the angle subtended between the image point and the sample point as the distance measure, the measure is independent of where the feature is in the image. $\sigma_d = \theta$ can be selected so that the sampling is neither over-blurred nor under sampled. This provides:

$$I_{f,i} = \sum_{j=1}^{m} I_j \exp\left(\frac{f^2((P_j \cdot P_{f,i})^2 - 1)}{2}\right) \qquad (41)$$

where $P_j \cdot P_{f,i}$ is the dot product of the two position vectors.

Using the radial sampling on the sphere, a one-dimensional Fourier transform for each ring in the sample pattern can be determined. Because the sample values are real, the Fourier transform is symmetric and half of it can be disregarded. The DC component can also be disregarded. The first ring includes six real samples that provide three complex values. The three complex values are the Fourier coefficients corresponding to 1 Hz, 2 Hz, and 3 Hz. Repeating the process for the second ring provides six Fourier coefficients (1 Hz-6 Hz), and so on for the remainder of the rings. The coefficients can be denoted as:

$$F_{r,k} \in \mathbb{C} \text{ where } r \in \{1 \ldots 8\}, k \in \{1 \ldots 3r\} \qquad (42)$$

In some embodiments a reference phase is determined by selecting the fundamental harmonic (1 Hz) value with the largest magnitude. The value with the largest magnitude can be found in ring R, and the reference phase can be defined as:

$$\varphi_{ref} = \frac{F_{R,1}}{|F_{R,1}|} \qquad (43)$$

The reference phase can be removed from the first harmonic by multiplying its complex conjugate. The second harmonic is multiplied by the square of the complex conjugate, and so on. A set of phase shifted Fourier coefficients can be defined as:

$$F'_{r,k} = F_{r,k} \overline{\varphi}_{ref}^{k} \qquad (44)$$

This provides a descriptor that is rotationally invariant (e.g., the rotation is equivalent to a phase shift). Two features that are similar except for their rotation should have the same phase reference although the reference will have a different value. Signals relative to their phase reference (i.e., signals with the reference subtracted) should differ only to the extent of the image noise.

In an embodiment the coefficients are rearranged into vectors to determine the descriptors. For example, the coefficients may be rearranged by:

$$F''_{((3r^2 - 3r + 2k)/2)} = F'_{r,k} \qquad (45)$$

A matrix of the descriptors for all the features in an image can be created. With one row per descriptor, a matrix with $n_f$ features, can be defined as:

$$F''_{i,j} \text{ where } i \in \{1 \ldots n_f\}, j \in \{1 \ldots 3/2(r^2 + r)\} \qquad (46)$$

In an embodiment, the descriptors in the two images are matched using the total signal power. The total signal power that is in phase between the two descriptors is determined as a portion of the total signal power if they were perfectly in phase. The match M between descriptors A and B can be defined as:

$$M = \frac{\text{Re}(A \cdot \overline{B})}{|A||B|} \qquad (46)$$

where $A \cdot \overline{B}$ is the dot product of A with the conjugate of B, $|x|$ is the magnitude of x, and $\text{Re}(x)$ is the real part of x. This provides M in the range of $\{-1 \ldots +1\}$, where $+1$ implies a perfect match. Substituting:

$$A' = \frac{A}{|A|}, B' = \frac{B}{|B|} \qquad (47)$$

provides $$M = \text{Re}(A' \cdot \overline{B'}) \qquad (48)$$

This provides a comparison between descriptors A and B. All the descriptors in one image can be compared with all the descriptors in another image using equation (47) to make A' and B' the normalized versions of the matrices defined by equation (46). With $n_{f,A}$ features in A' and $n_{f,B}$ features in B', M will be a $n_{f,A}$ by $n_{f,B}$ matrix of values indicating the similarity between the feature in A' indicated by the row and the feature in B' indicated by the column.

Features are likely the same if they are mutual best matches. This can be determined if there is an element M, M(i, j) that is the highest value in row i and the highest value in column j. Mutual best matches can be arranged into a list of putative point correspondences $C_{A,1 \ldots n_C}$ and $C_{B,1 \ldots n_C}$ such that for every $p \in \{1 \ldots n_C\}$, $C_{A,p}$ is a mutual best match with $C_{B,p}$.

In an embodiment, compatibility of the putative matches can be determined by constricting a matrix K as follows:

$$K \triangleq \qquad (49)$$

|  | $C_{A,1} \leftrightarrow C_{B,1}$ | $C_{A,2} \leftrightarrow C_{B2}$ | $\ldots$ | $C_{A,n_C} \leftrightarrow C_{B,n_C}$ |
|---|---|---|---|---|
| $C_{A,1} \leftrightarrow C_{B,1}$ | 1 | | | |
| $C_{A,2} \leftrightarrow C_{B2}$ | | 1 | | |
| $\vdots$ | | | $\ddots$ | |
| $C_{A,n_C} \leftrightarrow C_{B,n_C}$ | | | | 1 |

Each element of K, K(i, j) has a value of 1 if the match $C_{A,i} \leftrightarrow C_{B,i}$ is compatible with the match $C_{A,j} \leftrightarrow C_{B,j}$, otherwise it has a value of 0. Each match is compatible with itself so the diagonal is 1, and K(i, j)=K(j, i) so the matrix is symmetric and only half needs to be calculated.

The match $C_{A,i} \leftrightarrow C_{B,i}$ is compatible with the match $C_{A,j} \leftrightarrow C_{B,j}$ if the angle at the center of the sphere subtended by $C_{A,i}$ and $C_{A,j}$ is equal to the angle subtended by $C_{B,i}$ and $C_{B,j}$. Using the dot product, this can be presented as:

$$P(C_{A,i}) \cdot P(C_{A,j}) = P(C_{B,i}) \cdot P(C_{B,j}) \Rightarrow K(i,j) = 1$$

$$P(C_{A,i}) \cdot P(C_{A,j}) \neq P(C_{B,i}) \cdot P(C_{B,j}) \Rightarrow K(i,j) = 0 \quad (50)$$

where P(F) is the position (i.e., three-dimensional coordinates) on the unit sphere of the feature. The geometric interpretation of the dot product is:

$$P(C_{A,i}) \cdot P(C_{A,j}) = \cos(\alpha)$$

$$P(C_{B,i}) \cdot P(C_{B,j}) = \cos(\beta) \quad (51)$$

where $\alpha$ is the angle subtended by $C_{A,i}$ and $C_{A,j}$ and $\beta$ is the angle subtended by $C_{B,i}$ and $C_{B,j}$.

To account for error in the feature estimation, a threshold can be used to identify angles that are sufficiently different such that at least one of the matches is considered an outlier. The threshold can be described in terms of T as the equivalent pixel error measured at the principal point. The value of T can be determined using any one of a number of different techniques. For example, in some embodiments the value of T is determined based on an empirical error distribution of the precise detector for a given camera. If $\theta_T$ is the angular error threshold equivalent to T pixels at the principal point, then:

$$\sin(\theta_T) = \frac{f}{\sqrt{f^2 + T^2}} \quad (52)$$

where f is the focal length in pixels.

The criterion for K(i, j) in the matrix of equation (49) can be expressed as:

$$|\sin(\alpha - \beta)| < \sin(\theta_T) \quad (53)$$

where $$\sin(\alpha - \beta) = \sin(\alpha)\cos(\beta) - \cos(\alpha)\sin(\beta) \quad (54)$$
$$= \cos(\beta)\sqrt{1 - \cos^2(\alpha)} - \cos(\alpha)\sqrt{1 - \cos^2(\beta)}$$

Combining equations (51) and (54) gives:

$$(P(C_{B,i}) \cdot P(C_{B,j}))\sqrt{1 - (P(C_{A,i}) \cdot P(C_{A,j}))^2} - $$
$$(P(C_{A,i}) \cdot P(C_{A,j}))\sqrt{1 - (P(C_{B,i}) \cdot P(C_{B,j}))^2} < \frac{f}{\sqrt{f^2 + T^2}} \quad (55)$$

Equation (55) can be used to populate the matrix K of equation (49) to determine which pairs of matching features have matching angular separation.

In an embodiment, the largest consistent set of pairs of matching points is determined. This may involve taking the square of equation (49):

$$K' = K \cdot K \quad (56)$$

such that each element K'(i, j) will be the number of matches that are consistent with both match $C_{A,i} \leftrightarrow C_{B,i}$ and match $C_{A,j} \leftrightarrow C_{B,j}$. The element in K' with the highest value will indicate the most likely pair of matches. Denoting this value as $n'_C$, and the subsets of $C_{A,1 \ldots n_C}$ and $C_{B,1 \ldots n_C}$ that are compatible with match $C_{A,i} \leftrightarrow C_{B,i}$ and match $C_{A,j} \leftrightarrow C_{B,j}$ as $C'_{A,1 \ldots n'_C}$ and $C'_{B,1 \ldots n'_C}$, respectively, gives:

$$\begin{pmatrix} C_{A,k} \in C'_{A,1 \ldots n'_C} \\ \text{and} \\ C_{B,k} \in C'_{B,1 \ldots n'_C} \end{pmatrix} \text{iff} \begin{pmatrix} K(i, k) = 1 \\ \text{and} \\ K(k, j) = 1 \end{pmatrix} \quad (57)$$

Figure 7:
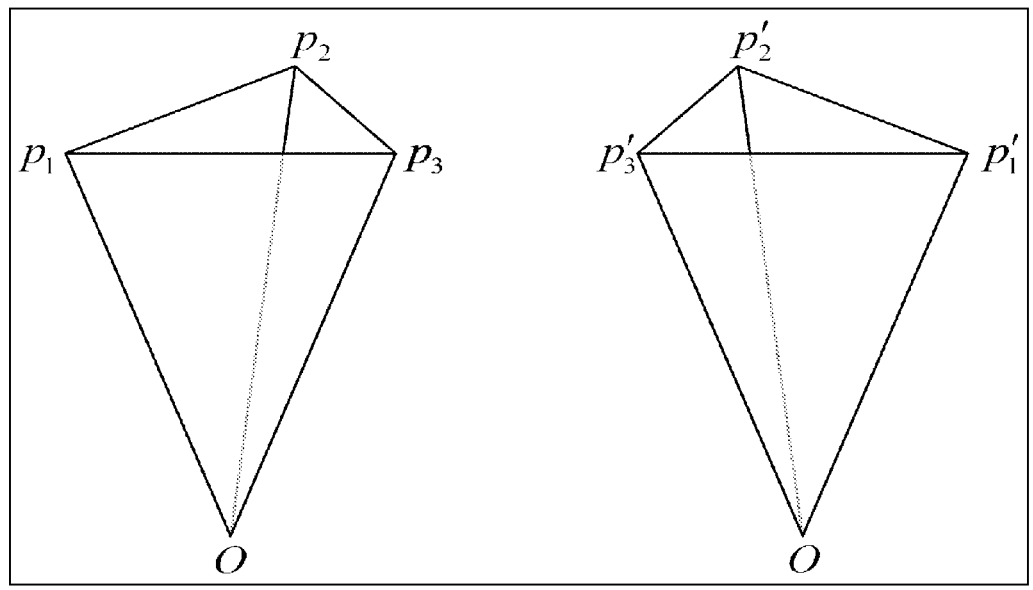
FIG. 7 is a simplified diagram showing an example of a reflection according to an embodiment of the present invention.

In an embodiment, matching pairs that are due to reflections rather than rotations are removed from the set of pairs of matching points. FIG. 7 is a simplified diagram showing an example of a reflection according to an embodiment of the present invention. As shown in FIG. 7, the angular constraints between $p_1, p_2, p_3$ and $p'_1, p'_2, p'_3$ are satisfied, but the points do not represent the same set of points on the surface of the sphere.

Reflections may be determined using any one of a number of techniques. For example, reflections may be determined using the scalar triple product. Given three points ($p_1, p_2, p_3$) on the surface of a sphere, the scalar triple product is:

$$V = (p_1 \times p_2) \cdot p_3 \quad (58)$$

where × indicates the cross product. V can be interpreted geometrically as the directed volume contained by $p_1, p_2, p_3$ and the center of the sphere. V will have a different sign depending on whether $p_1, p_2, p_3$ are in a clockwise or counterclockwise configuration. When V=0, the points $p_1, p_2, p_3$ are coplanar with the center of the sphere. In this case the reflection and rotation are the same and the points may be considered valid. The following equation can be used to identify reflections:

$$(P(C_{A,i}) \times P(C_{A,j})) \cdot P(C_{A,k}) = (P(C_{B,i}) \times P(C_{B,j})) \cdot P(C_{B,k}) \quad (59)$$

A threshold on |V| can be set to account for error in location of the points. Values below the threshold are considered coplanar. In an embodiment $\theta_T$ can used to determine the threshold. Considering the left side of equation (59), the maximum error will exist when the cross product is directly in-line with the error in $P(C_{A,k})$. The magnitude of this would be:

$$\|P(C_{A,i}) \times P(C_{A,j})\| \sin(\theta_T) \quad (60)$$

where $\|v\|$ indicates the norm of vector v. A similar threshold can be applied to the triple product on the right side of equation (59), and the test can be rewritten as:

$$\begin{vmatrix} (P(C_{A,i}) \times P(C_{A,j})) \cdot P(C_{A,k}) \\ - \\ (P(C_{B,i}) \times P(C_{B,j})) \cdot P(C_{B,k}) \end{vmatrix} \leq \begin{pmatrix} \|P(C_{A,i}) \times P(C_{A,j})\| \\ + \\ \|P(C_{B,i}) \times P(C_{B,j})\| \end{pmatrix} \sin(\theta_T) \quad (61)$$

In an embodiment, the right side of equation (61) and the cross product on the left side can be calculated for a given i and j. The test can be applied for every k that satisfies equation (57). Pairs of matching points that do not satisfy equation (61) can be removed from the set. If points are removed, the number of remaining matches, $n''_C$, can be compared to the next highest value in K'. The largest set of matches has been determined if $n''_C$ is greater than or equal to the next highest value in K'. If $n''_C$ is less than the next highest value in K', equations (57)-(61) can be applied to the i and j corresponding to the next highest value in K'. The process can be iterated until a value of $n''_C$ is identified that is greater than or equal to all the remaining values in K'. This largest consistent set of matching pairs of points can be denoted as $C''_{A,1 \ldots n''_C}$ and $C''_{B,1 \ldots n''_C}$.

In an embodiment, the coordinate transformations between overlapping images can be determined using the set of pairs of matching points. Subject to any error in locating the features, coordinates of one set of pairs will be the same as the matching set subject to a rotation about the center of the sphere. The transformation between coordinates in a first image (image A) and a second image (image B) can be determined using a singular value decomposition on the matrix product of the feature coordinates in image A and the transpose of the coordinates in image B. This gives two orthogonal matrices U and V and a singular matrix S as illustrated by:

$$U \cdot S \cdot V^T = P(C''_{A,1} \ldots n''_C) \cdot P(C''_{B,1} \ldots n''_C)^T \tag{62}$$

The product of the transpose of V and the transpose of U will give the transform from coordinates in image A to coordinates in image B ($X_{A \to B}$).

$$X_{A \to B} = V^T \cdot U^T \tag{63}$$

Equation (63) minimizes the sum of the squares of the residuals if the errors in feature coordinates have a Gaussian distribution.

If the series of overlapping images includes more than two images, the coordinate transformation between each set of overlapping images can be determined and the transformations combined. As an example, a series of overlapping images may include image A, image B, and image C, with a portion of image A overlapping a portion of image B, and a portion of image B overlapping a portion of image C. The coordinate transformation between image A and image B can be determined, and the coordinate transformation between image B and image C can be determined. The transforms can be combined to determine the coordinate transformation between image A and image C as follows:

$$X_{A \to C} = X_{B \to C} \cdot X_{A \to B} \tag{64}$$

Transforms can be combined to determine the coordinate transformation between any two images as long as the transformations between intermediate images have been determined.

In some embodiments, the series of images may create a 360° panoramic image. The sequence of transforms in this case would be a closed sequence as illustrated by:

$$X_{Z \to A} \ldots X_{B \to C} \cdot X_{A \to B} = X_{A \to A} \tag{65}$$

The transform $X_{A \to A}$ should be the identity matrix, but small errors in one or more of the intermediate transformations may result in the matrix not being identity. Known techniques can be used to optimize the transforms to account for the errors. For example, known Block Bundle Adjustment techniques can be used to enforce the constraint that the closed chain of transforms should be the identity transform. The effect is to apply a small rotation to each of the estimated transforms such that the closure constraint is enforced. Denoting the transform modified by the Block Bundle Adjustment as $X'_{A \to B}$, the closure constraint is enforced by calculating:

$$X'_{A \to Z} = X'_{Y \to Z} \ldots X'_{B \to C} \cdot X'_{A \to B} \tag{66}$$

The value of $X'_{A \to Z}$ should be the same regardless of the sequence of intermediate transforms. As a result, the transform from each image to every other image in the series can be determined. For example, the transform between a first image in the series (image E) and a second image in the series (image H) can be calculated using:

$$X'_{E \to H} = X'_{A \to H} (X'_{A \to E})^{-1} = X'_{A \to H} (X'_{A \to E})^T \tag{67}$$

Constraints can be applied so that the coordinate transformations between overlapping images can be used to determine angles between points in the images. As with a conventional theodolite, a coordinate transformation can also be determined between the image coordinate frame and a real world coordinate system (e.g., the local coordinate frame), thus allowing azimuth and elevation to be measured. Because the origin of the local coordinate frame is generally not the origin of the image coordinate frame, the transform may include a translation and a rotation. Determining the transform is essentially equivalent to determining how the imaging device is translated and rotated with respect to the local coordinate frame. In surveying this procedure is typically referred to as stationing.

In an embodiment, the coordinate transformation between the image coordinate frame and the local coordinate frame uses vector↔vector constraints. Vector↔vector constraints establish corresponding vectors in the image coordinate frame and the local coordinate frame. One method of obtaining a correspondence between vectors in the image coordinate frame and the local coordinate frame includes positioning the imaging device over a known point ($p_1$). As an example, the known point may be a survey mark. Another known point ($p_2$) is identified in at least one of the images. A unit vector from $p_1$ in the direction of $p_2$ in the local coordinate frame is represented as:

$$v_{WORLD} = (p2 - p1)/\|p2 - p1\| \tag{68}$$

The unit vector in the camera reference frame is represented as:

$$v_{CAMERA} = [x, y, 1]/\|[x, y, 1]\| \tag{69}$$

where x and y are normalized image coordinates described by equations (5) and (6). These coordinates can be transformed to the reference camera frame using equation (67).

Another method of obtaining a correspondence between vectors in the image coordinate frame and the local coordinate frame includes using a tilt sensor to determine the gravity vector in the camera reference frame. The tilt sensor can be considered as having its own coordinate frame. With the imaging device attached to the tilt sensor, a transformation can be defined to the camera coordinate system ($X_{TILT \to CAMERA}$). This transformation can be determined by calibration of the assembly. When inside its operating range, the tilt sensor will either directly or indirectly indicate the gravity vector ($v_{TILT}$) in its own coordinate system. This can be transformed to the camera coordinate system:

$$v_{CAMERA} = X_{TILT \to CAMERA} \cdot v_{TILT}/\|v_{TILT}\| \tag{70}$$

The local coordinate system is typically defined so that the z-axis points in the opposite direction to the gravity vector, so the corresponding vector in the local coordinate system is [0,0,−1].

Singular value decomposition can be used to calculate the rotation part of the transformation between the image coordinate frame and the local coordinate frame using at least two vector↔vector correspondences. In some embodiments, a check is performed to ensure the rotation is calculated and not a reflection. If the transform is a rotation its determinant will be +1, whereas the determinant of a reflection will be −1. The rotation can be obtained by calculating the transform using the equations:

$$U \cdot S \cdot V^T = [v_{CAMERA,1}, \ldots v_{CAMERA,n}] \cdot [v_{WORLD,1} \ldots v_{WORLD,n}]^T \tag{71}$$

$$[c_1, c_2, c_3] = V^T \cdot U^T \tag{72}$$

$$X_{CAMERA \to WORLD} = [c_1, c_2, c_3 | c_1, c_2, c_3|] \tag{73}$$

where $v_{CAMERA,i}$, $v_{WORLD,i}$, and $c_i$ are all column vectors. This provides the rotation part of the transformation.

The translation part of the transformation between the image coordinate frame and the local coordinate frame can be determined by placing the imaging device over a known point or it can be measured using known techniques.

In an embodiment, the coordinate transformation between the image coordinate frame and the local coordinate frame uses vector↔point constraints. Vector↔point constraints establish correspondences between the local coordinates of point features and their corresponding image coordinates. The image coordinates represent a unit vector that can be transformed to the camera reference frame. Known techniques can be used to determine the coordinate transformation between the image coordinate frame and the local coordinate frame using vector↔point correspondences. For example, the known Space Resection technique uses at least three vector↔point correspondences to calculate the rotation and translation simultaneously.

In some embodiments, a transformation between the image coordinate frame and a leveled, un-oriented coordinate frame may be determined. This can be thought of as an intermediate coordinate system between the image coordinate frame and the local coordinate frame. The leveled, un-oriented coordinate frame is the coordinate system typically used with a conventional theodolite. Determining the transformation between the image coordinate frame and the leveled, un-oriented coordinate frame allows any survey procedure to be performed using embodiments of the present invention that could be performed using a conventional theodolite.

A transformation between the image coordinate frame and a leveled, un-oriented coordinate frame may be determined, for example, by determining one or more correspondences between the gravity vector and a vector with respect to the camera reference frame as described above. These correspondences can be used to determine a rotation only transform $X_{CAMERA \to LUCS}$ (where LUCS is an abbreviation for leveled, un-oriented coordinate system). This transform can be used to measure horizontal and vertical angles between points in the images. The transform can be used to perform any measurements performed by conventional theodolites. For example, angular measurements can be made to a point in an image with a known (or calculated) azimuth. The difference between the known azimuth and the measured horizontal angle can be added to subsequent measurements to give azimuths. This is analogous to measurements made to a backsight using a conventional theodolite.

For compatibility with existing survey processes, some embodiments include methods for calculating polar coordinates. As described above, a point [x, y, 1] in an image plane can be transformed to the camera reference frame and to the local coordinate frame. Denoting the new coordinates of the point as [X, Y, Z] gives:

$$[X, Y, Z]^T = X_{REF\_CAMERA \to WORLD} \cdot X_{CAMERA \to REF\_CAMERA} \cdot [x, y, z]^T \quad (74)$$

Figure 8:
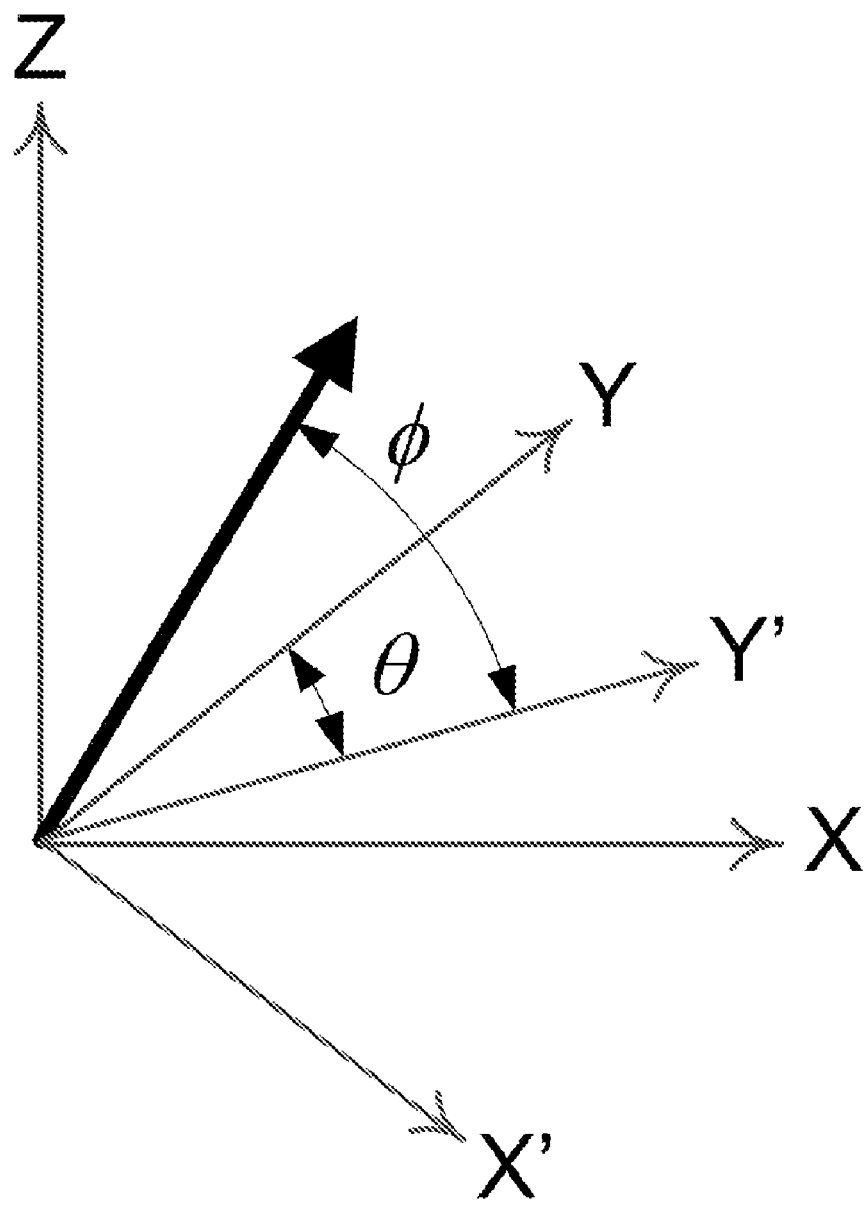
FIG. 8 is a simplified diagram showing a Euler angle convention according to an embodiment of the present invention.

FIG. 8 is a simplified diagram showing a Euler angle convention according to an embodiment of the present invention. As shown in FIG. 8, North is defined as being in the direction of the Y axis, Up is defined as being in the direction of the Z axis, θ is defined as being an azimuth from North, and φ is defined as being an elevation from the horizontal plane. θ has the range {−π, +π}, and φ has the range {−π/2, +π/2}. Note that one of ordinary skill in the art could easily adapt the following equations to fit alternative Euler angle conventions.

As defined above, θ and φ can be calculated as:

$$\theta = \arctan2(X, Y) \quad (75)$$

$$\phi = \arctan\left(\frac{Z}{\sqrt{X^2 + Y^2}}\right)$$

where arctan 2(X,Y) is defined as:

$$\arctan2(X, Y) = \begin{cases} \arctan\left(\frac{X}{Y}\right) & Y > 0 \\ \pi + \arctan\left(\frac{X}{Y}\right) & X \geq 0, Y < 0 \\ -\pi + \arctan\left(\frac{X}{Y}\right) & X < 0, Y < 0 \\ \frac{\pi}{2} & X > 0, Y = 0 \\ -\frac{\pi}{2} & X < 0, Y = 0 \\ \text{undefined} & X = 0, Y = 0 \end{cases} \quad (76)$$

Figure 9:
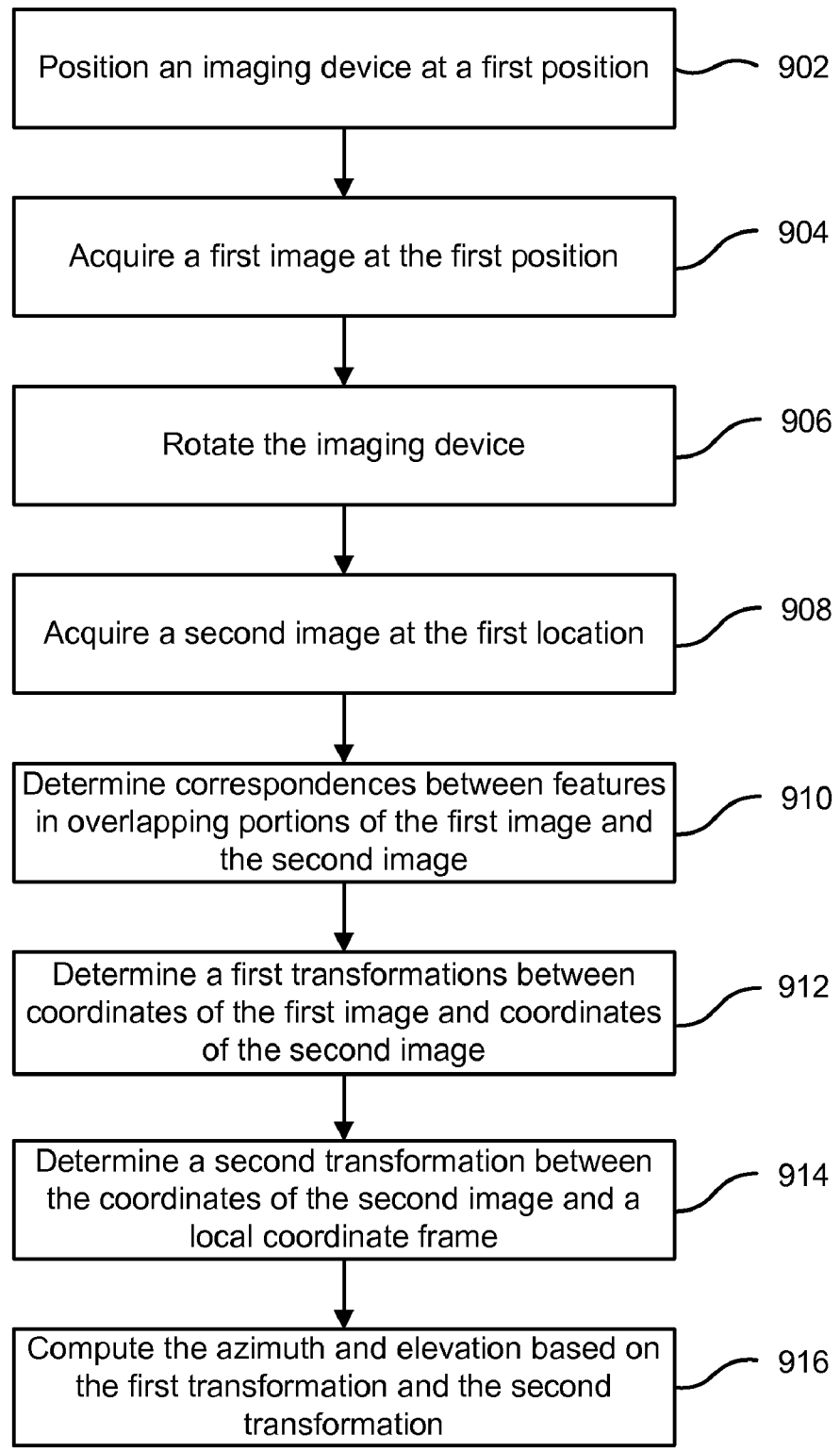
FIG. 9 is a simplified flowchart illustrating a method of determining an azimuth and an elevation of a point in a first image according to an embodiment of the present invention.

FIG. 9 is a simplified flowchart illustrating a method of determining an azimuth and an elevation of a point in a first image according to an embodiment of the present invention. The method includes positioning an imaging device at a first position (902). A first image is acquired at the first position using the imaging device (904). The imaging device is rotated about a first axis (906). For example, the imaging device may be rotated about horizontal and/or vertical axes to capture objects of interest in the surrounding scene. The angle of rotation about the first axis depends in part on the distinctness of the features in the surrounding scene and the required accuracy of the coordinate transformations. A second image is acquired from the first position (908). In an embodiment, the first position refers to the position of the optical center of the imaging device.

Correspondences between features in overlapping portions of the first image and the second image are determined (910). A first coordinate transformation is determined between coordinates of the first image and coordinates of the second image (912). A second coordinate transformation is determined between the coordinates of the second image and a local coordinate frame (914). The azimuth and elevation of the point are determined based on the first transformation and the second transformation.

Figure 10:
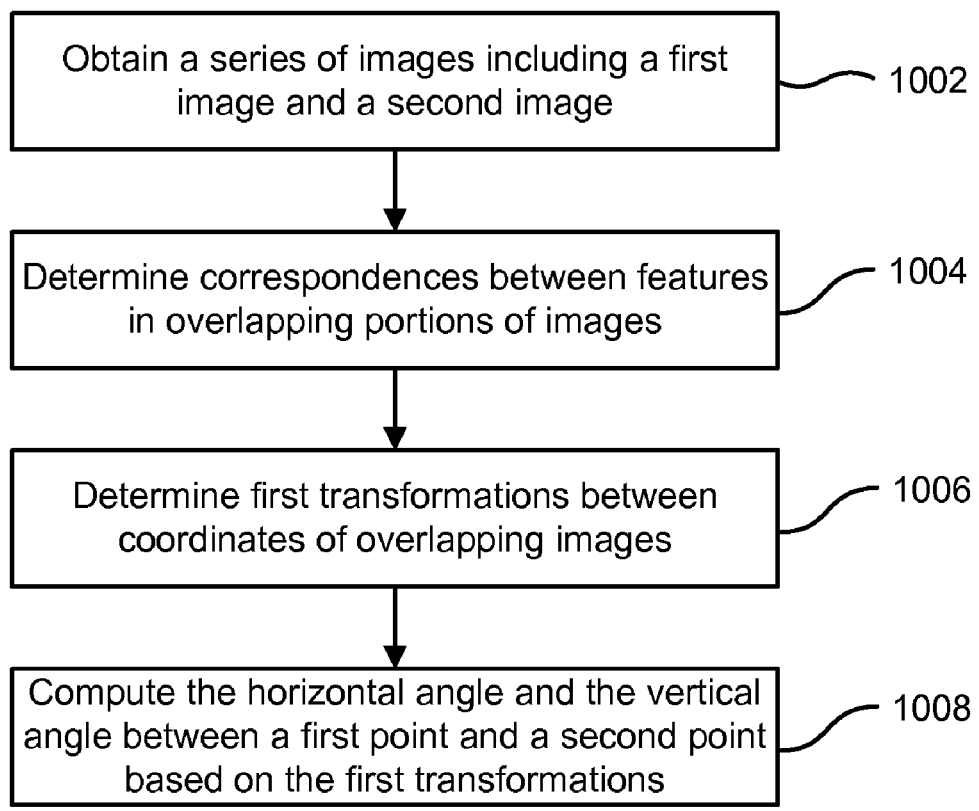
FIG. 10 is a simplified flowchart illustrating a method of determining a horizontal angle and a vertical angle between a first point in a first image and a second point in a second image according to an embodiment of the present invention.

FIG. 10 is a simplified flowchart illustrating a method of determining a horizontal angle and a vertical angle between a first point in a first image and a second point in a second image according to an embodiment of the present invention. The method includes obtaining a series of images including the first image and the second image (1002). In an embodiment, a portion of each image in the series overlaps a portion of another image in the series. Each image in the series is obtained from a first position. Correspondences are determined between features in overlapping portions of images in the series of images (1004). First transformations are determined between coordinates of overlapping images in the series of images (1006). The horizontal angle and the vertical angle is computed between the first point and the second point based on the first transformations (1008).

It should be appreciated that the specific steps illustrated in FIGS. 9 and 10 provide particular methods, and other sequences of steps may also be performed according to alternative embodiments. For example, alternative embodiments of the present invention may perform the steps outlined above in a different order. Moreover, the individual steps illustrated in FIGS. 9 and 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Some methods of the present invention, such as the methods illustrated in FIGS. 9 and 10, provide images than can be used for acquiring high resolution angular measurements. If an object or point of interest for which an angular measurement is desired is not included in the images, some embodiments include acquiring subsequent images that include the object or point of interest. For example, the object or point of interest may exist outside the field of view of the images (e.g., the original images), or the object or point of interest may not have existed or may not have been visible when the original images were captured. In an embodiment, subsequent images are acquired from the same position as the original images. By acquiring subsequent images that overlap a portion of the original images, coordinate transformations can be determined between the subsequent images and the original images as described above. Using the coordinate transformations, the angles of the object or point of interest can be determined. One of ordinary skill in the art would recognize many variations, modifications, and alternatives.

In an embodiment of the present invention, one or more targets may placed in a scene to provide stable features for matching overlapping portions of images. A target may be any object that has a distinctive pattern to enhance feature matching. In one embodiment, targets are used as markers for specific points in images that may otherwise be difficult to identify. In another embodiment, targets are placed in scenes that are dynamic or that may change over time. Here the targets may be used, for example, to provide stable features for matching subsequent images. One of ordinary skill in the art would recognize many variations, modifications, and alternatives.

It is to be understood that the features of one or more embodiments of the invention may be combined with one or more features of other embodiments of the invention without departing from the scope of the invention. Also, the examples and embodiments described herein are for illustrative purposes only and various modifications or changes in light thereof will be suggested to persons skilled in the art and are to be included within the spirit and purview of this application and scope of the appended claims.

What is claimed is:

1. A method of determining an azimuth and an elevation of a point visible in a first image, the azimuth and the elevation of the point determined in a real world coordinate system, the method comprising:
    positioning an imaging device at a first position;
    acquiring the first image at the first position, the first image including the point; thereafter
    performing a first rotation of the imaging device;
    acquiring a second image at the first position, the second image acquired after performing the first rotation, wherein a portion of the first image overlaps a portion of the second image;
    determining correspondences between features in overlapping portions of the first image and the second image;
    determining a first transformation between coordinates of the first image and coordinates of the second image based on the correspondences;
    determining a second transformation between the coordinates of the second image and the real world coordinate system; and
    computing the azimuth and the elevation of the point in the real world coordinate system based on the first transformation and the second transformation.

2. The method of claim 1 further comprising determining the azimuth and the elevation of each of a plurality of points, at least some of the plurality of points visible in only the first image and at least some of the plurality of points visible in only the second image, the azimuth and the elevation of each of the plurality of points determined in the real world coordinate system, the method comprising:
    computing the azimuth and the elevation of each of the plurality of points visible in only the first image based on the first transformation and the second transformation; and
    computing the azimuth and the elevation of each of the plurality of points visible in only the second image based on the second transformation.

3. The method of claim 1 further comprising determining the azimuth and the elevation of a third point visible in only a third image, the azimuth and the elevation of the third point determined in the real world coordinate system, the method comprising:
    performing a second rotation of the imaging device;
    acquiring the third image at the first position, the third image acquired after performing the second rotation, wherein a second portion of the second image overlaps a portion of the third image;
    determining correspondences between features in overlapping portions of the second image and the third image;
    determining a third transformation between coordinates of the second image and coordinates of the third image based on the correspondences between features in the second portion of the second image and the portion of the third image; and
    computing the azimuth and the elevation of the third point in the real world coordinate system based on the second transformation and the third transformation.

4. The method of claim 1 wherein determining correspondences between features in the portion of the first image and the portion of the second image comprises:
    determining pixel coordinates of each of the features in the first image and each of the features in the second image; and thereafter
    determining sub-pixel coordinates of each of the features in the first image and each of the features in the second image, wherein determining the sub-pixel coordinates comprises determining sub-pixel intensity gradients in an area surrounding each of the features and correcting for an image distortion associated with each of the features.

5. The method of claim 1 wherein determining correspondences between features in the portion of the first image and the portion of the second image comprises:
    determining descriptors for each of the features in the first image and each of the features in the second image; and
    determining that at least a portion of the descriptors of the features in the first image correspond to at least a portion of the descriptors of the features in the second image.

6. The method of claim 5 wherein the descriptors are invariant to rotation of the imaging device.

7. The method of claim 5 wherein determining that at least a portion of the descriptors of the features in the first image correspond to at least a portion of the descriptors of the features in the second image comprises comparing an angular separation between a pair of features in the first image to an angular separation between a corresponding pair of features in the second image.

8. The method of claim 1 wherein coordinates of the first position in the real world coordinate system are known and coordinates of a second point in the real world coordinate system are known, the second point being visible in at least one of the first image or the second image, and wherein determining the second transformation comprises determining a vector from the first position in a direction of the second point.

9. The method of claim 1 further comprising aligning the imaging device with a gravity vector prior to acquiring the first image and the second image.

10. The method of claim 1 wherein coordinates of a second point in the real world coordinate system are known, the second point being visible in at least one of the first image or the second image, and wherein determining the second transformation comprises determining a vector between the coordinates of the second point in the real world coordinate system and coordinates of the second point in an image coordinate frame.

11. The method of claim 1 further comprising:
positioning the imaging device at a second position different from the first position;
acquiring a third image at the second position, the third image including the point;
determining a third transformation between the coordinates of the third image and the real world coordinate system;
computing the azimuth and the elevation of the point relative to the second position using the third transformation; and
computing coordinates of the point in the real world coordinate system.

12. A method of determining a horizontal angle and a vertical angle between a first point visible in a first image and a second point visible in a second image, the method comprising:
obtaining a series of images including the first image and the second image using an imaging device, wherein a portion of each image in the series overlaps a portion of another image in the series and wherein each image in the series is obtained from a first position by rotating the imaging device without substantially changing an optical center of the imaging device;
determining correspondences between features in overlapping portions of images in the series of images;
determining first transformations between coordinates of overlapping images in the series of images; and
computing the horizontal angle and the vertical angle between the first point and the second point based on the first transformations.

13. The method of claim 12 further comprising determining the horizontal angle and the vertical angle between the first point in the first image and a plurality of points in the second image, the method comprising:
computing the horizontal angle and the vertical angle between the first point and each of the plurality of points in the second image based on the first transformations.

14. The method of claim 12 further comprising:
determining a second transformation between coordinates of an image in the series and a real world coordinate system, wherein computing the horizontal angle and the vertical angle between the first point and the second point further comprises computing an azimuth and an elevation of the first point and of the second point in the real world coordinate system based on the first transformations and the second transformation.

15. The method of claim 12 wherein determining the first transformations comprises applying a closure constraint.

16. A surveying apparatus comprising:
a support structure;
a rotatable member mechanically coupled to the support structure;
an imaging device mechanically coupled to the rotatable member, wherein the rotatable member is configured to rotate the imaging device without substantially changing a position of an optical center of the imaging device;
an image sensor disposed in the imaging device, the image sensor configured to acquire images;
a memory in electrical communication with the image sensor, the memory configured to store the images; and
a processor in electrical communication with the image sensor and the memory, the processor configured to:
determine correspondences between features in overlapping portions of the images;
determine first transformations between coordinates of overlapping images based on the correspondences;
determine a second transformation between coordinates of one of the images and a real world coordinate system; and
compute an azimuth and an elevation of each of a plurality of points visible in the images, the azimuth and the elevation computed in the real world coordinate system based on the first transformations and the second transformation.

17. The surveying apparatus of claim 16 further comprising:
a tilt sensor mechanically coupled to the surveying apparatus, the tilt sensor configured to determine a gravity vector relative to the imaging device.

18. The surveying apparatus of claim 17 wherein the processor is configured to determine the second transformation based at least in part on the gravity vector.

19. The surveying apparatus of claim 16 wherein the imaging device is a digital camera, and wherein the digital camera is calibrated to provide a relationship between a coordinate frame associated with the digital camera and an image coordinate frame.

20. The surveying apparatus of claim 16 further comprising a digital display in electrical communication with the image sensor and the memory, the digital display configured to display the images acquired by the image sensor and the images stored in the memory.

21. A method of registering a series of overlapping images acquired from a first position in a real world coordinate system, the method comprising:
determining correspondences between features in overlapping portions of images in the series;
determining first transformations between coordinates of overlapping images in the series, the first transformations determined based on the correspondences; and
determining a second transformation between coordinates of an image in the series and the real world coordinate system.

* * * * *